United States Patent

Higurashi et al.

[11] Patent Number: 5,500,679
[45] Date of Patent: Mar. 19, 1996

[54] METHOD AND APPARATUS FOR DERIVING A VIDEO SIGNAL CORRESPONDING TO A STANDARD DEFINITION SIGNAL FROM A HIGH DEFINITION SIGNAL

[75] Inventors: Seiji Higurashi, Fuchu; Yasuhiko Teranishi, Kanagawa; Yasuaki Yamada, Kanagawa; Takeo Ohishi, Kanagawa, all of Japan

[73] Assignee: Victor Company of Japan, Ltd., Yokohama, Japan

[21] Appl. No.: 314,518

[22] Filed: Sep. 28, 1994

[30] Foreign Application Priority Data

Sep. 30, 1993 [JP] Japan ................................. 5-268441

[51] Int. Cl.⁶ ...................................................... H04N 7/01
[52] U.S. Cl. ........................ 348/432; 348/441; 348/437
[58] Field of Search ................................. 348/441, 398, 348/397, 392, 426, 437, 432, 438, 427; H04N 7/01, 7/12

[56] References Cited

U.S. PATENT DOCUMENTS

| | | | |
|---|---|---|---|
| 5,032,908 | 7/1991 | Miller | 348/437 |
| 5,216,719 | 6/1993 | Oh | 348/398 X |
| 5,220,422 | 6/1993 | Oh. | |
| 5,337,089 | 8/1994 | Fisch | 348/446 |
| 5,384,869 | 1/1995 | Wilkinson et al. | 348/398 X |

FOREIGN PATENT DOCUMENTS

| | | |
|---|---|---|
| 405754 | 1/1991 | European Pat. Off. . |
| 465732 | 1/1991 | European Pat. Off. . |
| 4-311883 | 11/1992 | Japan . |
| 5244569 | 9/1993 | Japan . |
| 9119384 | 12/1991 | WIPO . |

OTHER PUBLICATIONS

Proceeding of International Conference on Acoustics Speech and Signal Processing, M. Antonini, et al. "Image Coding—" M 9.10, 2297–2300 (1990).

*Primary Examiner*—Victor R. Kostak
*Attorney, Agent, or Firm*—Michael N. Meller

[57] ABSTRACT

A standard definition (SD) corresponding image is derived from a high definition (HD) image by performing a vertical line sub-sampling for every field with a ratio of an N:1, where N is an odd number greater than 1. One of the simple sub-sampling methods, the pyramidal coding method and the sub-band coding method may be used. For first fields, every third line is derived. For the remaining fields, every third line positioned at the center of the lines derived from the first field is derived by taking positional relation thereof on a reproduced image screen into consideration. As a result, it is possible to obtain an SD corresponding image having an unbroken interlace structure.

11 Claims, 6 Drawing Sheets

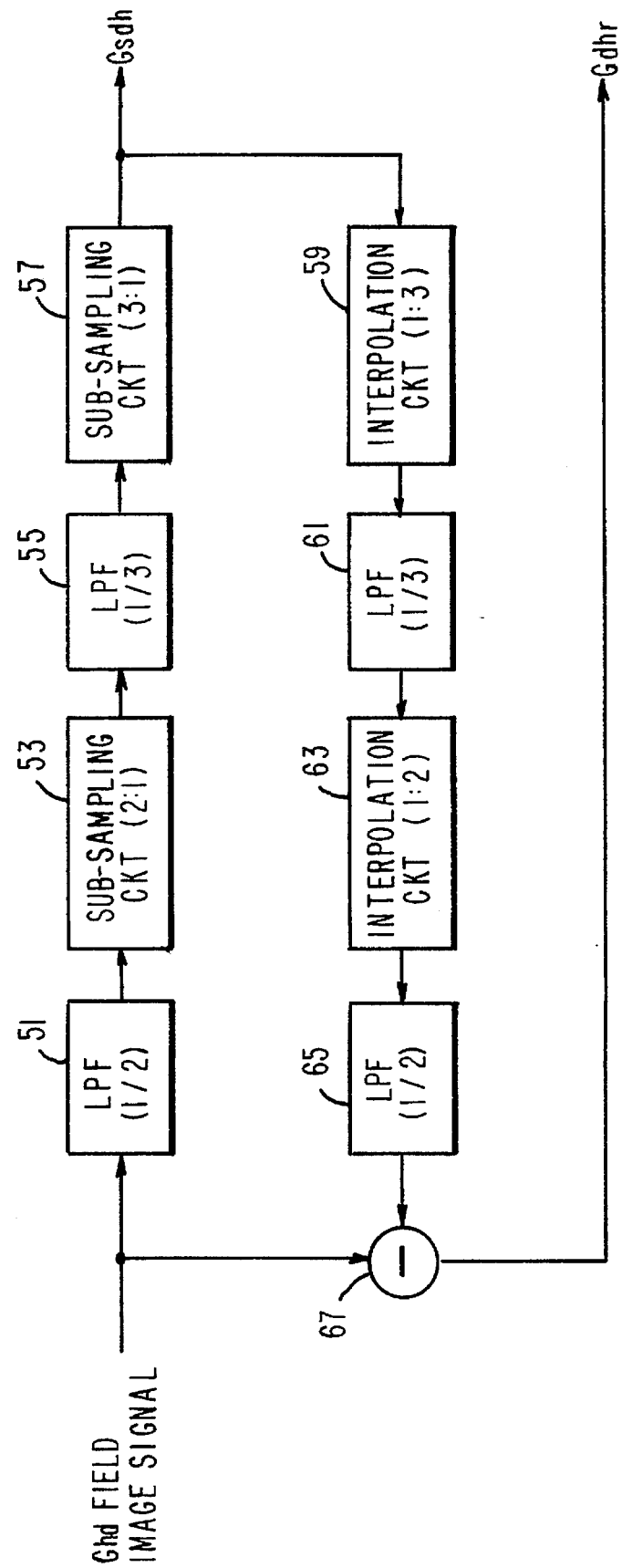

METHOD AND APPARATUS FOR DERIVING A VIDEO SIGNAL CORRESPONDING TO A STANDARD DEFINITION SIGNAL FROM A HIGH DEFINITION SIGNAL

BACKGROUND OF THE INVENTION

1. Field of the Invention

The present invention relates to a video signal processing method and apparatus in which a high definition (HD) video signal is processed after being divided into a signal which is suitable for reproduction as a standard definition (SD) video signal and a signal from which a HD image can be reproduced by processing it together with the SD video signal. Particularly, the present invention relates to a video signal processing method and apparatus suitable for deriving a video signal corresponding to an SD signal from a HD signal.

2. Description of the Prior Art

The television broadcasting of HD image signals such as High-Vision is becoming more popular. The television broadcasting of SD image signals such as in the NTSC system is so widely used that such systems should continue for the forseeable future. In view of this, it is convenient that video devices such as a video tape recorder (VTR) is capable of handling images of both the HD video signal and the SD video signal. An image signal processing system has been proposed which is compatible with both the HD image signal and the SD image signal. In such proposal, a portion of a bit stream which is obtained by coding an image information of the HD signal is derived and decoded to obtain an image information of the SD image signal.

FIG. 1 shows the basic construction of a known recording and reproducing apparatus which is capable of recording and reproducing both the SD image signal and the HD image signal. In FIG. 1, an HD signal Ghd is supplied to an encoder 10 in which an SD image signal Gsdh is derived from the HD image signal Ghd. The SD image signal Gsdh is supplied from one output of encoder 10 through a switch 12 to a recording and reproducing apparatus 14. The remaining additional image signal Ghdr appears at a second output of encoder 10 and is also applied to the recording and reproducing apparatus 14. When the SD image signal Gsd, also applied directly to switch 12, is to be recorded, the Gsd signal is supplied to the recording and reproducing apparatus 14 by switching the switch 12. In this case, the additional image signal Ghrd from the encoder 10 is not recorded.

In the recording and reproducing apparatus 14, the input signals Ghdr and Gsdh (or Gsd) are recorded on a video tape, etc., separately. In reproduction, the HD image signal is reproduced by adding the additional image signal Ghdr to the SD image signal Gsdh, and the SD image signal is reproduced by decoding only the SD image signal Gsdh (or Gsd).

As mentioned, the following advantages are obtained by separating the HD image signal Ghd into the SD image signal Gsdh and the additional image signal Ghdr:

(1) When a tape on which both the SD image signal Gsdh and the additional image signal Ghdr are recorded simultaneously is used, it is possible to reproduce either an HD image or an SD image. When a SD reproducing apparatus capable of reproducing only an SD signal is used, it is possible to reproduce the SD image.

(2) The SD reproducing apparatus dedicated to reproducing the SD image signal can reproduce from a magnetic tape on which the SD image signal Gsd is recorded by means of the SD recording apparatus capable of recording a SD signal. Further, an apparatus capable of reproducing the HD image signal can reproduce such magnetic tape as the HD image by making the additional image signal Ghdr "0" or reproduce the SD image signal as the SD image.

(3) Consequently, it is possible to construct a system in which the HD image and the SD image are compatible.

When the HD and SD images have an interlace structure, there is a time difference between fields constituting a frame. When an image corresponding to the SD image is derived by vertically sampling an HD image from an HD frame in the ratio of 2:1 as shown in FIG. 2, only one field image of the HD image is sampled. Thus, any movement of an image corresponding to the sampled SD image will not be smooth. Therefore, deriving the image corresponding to the SD image should be performed after field separation of the HD image.

The High-Vision system, for example, is utilized for the HD image and the NTSC system is used for the SD image. In each of these systems, the 2:1 interlace structure is employed. Accordingly, in the description of the prior art shown below, the image signal corresponding to the SD image will be described as being derived after the HD image is field-separated.

The signal processing in the encoder 10 of FIG. 1 for separating the HD image signal into the SD corresponding image signal Gsdh and the additional image signal Ghdr is performed according to one of the following three methods:

(1) Simple Sub-Sampling

The simplest method is simple sub-sampling of a signal. The HD image is sampled at every other point horizontally and vertically. A reduced image formed by the sampled points becomes the SD corresponding image and the remaining sampling points becomes the additional image signal Ghdr. FIG. 2 which shows a field image illustrates an example of the 2:1 (every other point) sampling horizontally and vertically. In FIG. 2, PA indicates sampling points of the HD image and PB indicates sampling points of the sub-sampled SD corresponding image.

(2) Pyramidal Coding

The pyramidal coding method is disclosed in, for example, Japanese Patent Application Laid-open H4-311883 and "Construction of Current TV/HDTV Compatible Coding Method", the Institute of Electronic Information Communication, D-335, Spring 1992.

The pyramidal coding will be described with reference to FIG. 3. In FIG. 3, a low-pass filter (LPF) 21 functions to cut off a horizontal high frequency component of a HD image signal Ghd to limit its frequency band to a half frequency for every field. An output signal of the LPF 21 is 2:1 sub-sampled by a sub-sampling circuit 23 in the horizontal direction. A LPF 25 cuts off a vertical high frequency component of the output signal of the sub-sampling circuit 23 to limit its frequency band to a half frequency. An output signal of the LPF 25 is 2:1 sub-sampled by a sub-sampling circuit 27 in the vertical direction. An output signal of the sub-sampling circuit 27 is the SD corresponding image signal Gsdh.

Then, the interpolation circuit 29 interpolates the SD corresponding image signal Gsdh with "0" value once for 1 vertical sample (1:2 interpolation). A LPF 31 band-limits an output of the interpolation circuit 29. Then, an interpolation circuit 33 interpolates an output of the LPF 31 with "0" value once for 1 horizontal sample (1:2 interpolation). A LPF 35 band-limits an output of the interpolation circuit 33. By this interpolation processing, the signal is expanded doubly in both vertical and horizontal directions. The image signal thus interpolated is subtracted from the HD image signal Ghd by a subtracter 37, resulting in the additional image signal Ghdr.

(3) Sub-band Coding

This method separates the HD image signal by using a combination of sub-band dividing filters. FIG. 4 shows an example of a construction of such filters. A HD image signal Ghd is divided horizontally into high and low frequency regions by filters 16 and 18 respectively. Then, outputs of the filters 16 and 18 are 2:1 sub-sampled by sub-sampling circuits 16A and 18A, respectively. A high frequency component H from the sub-sampling circuit 16A is divided vertically into high and low frequency regions by filters 20 and 22 respectively. Outputs of these filters are 2:1 sub-sampled by sub-sampling circuits 20A and 22A, respectively.

A low frequency component L from the sub-sampling circuit 18A is divided vertically into high and low frequency regions by filters 24 and 26, respectively and outputs of these filters are 2:1 sub-sampled vertically by sub-sampling circuits 24A and 26A, respectively. By this sub-band dividing process, four band signals HH, HL, LH and LL are obtained. The signal LL is made the SD corresponding image signal Gsdh and the signals HL. LH and HH form the additional image signal Ghdr.

In the conventional techniques mentioned above, however, since the vertical 2:1 (even number:1) sub-sampling is the precondition, there may be a problem that the interlace structure is broken by the sub-sampling. This has been pointed out in "4. Scan Line Position Structure of Interlace" in "Problems and Solutions in Current TV/HDTV Compatible Coding", the Institute of Electronic Information Communication, D-334, Spring, 1992.

Describing this with reference to FIG. 5, it is assumed that an SD corresponding image is obtained by vertically 2:1 sub-sampling an HD image shown in FIG. 5(A). Solid lines in the same figure show odd numbered fields and broken lines show even numbered fields. FIG. 5(B) shows the SD corresponding image formed by fields obtained by sampling the respective fields of every other line. The latter has an incomplete interlace scan line position structure, resulting in an image whose vertical continuity is degraded.

This problem is usually produced when a vertical sub-sampling is used (N:1 where N is an even number greater than 1). This is the system commonly used for the simple sub-sampling, the pyramidal coding and the sub-band coding.

According to the previously mentioned articles, this problem may be solved by any of the following procedures:

(a) A position shift is performed by post-process of a current TV decoder.

(b) Scan line position of HDTV is preliminarily shifted by a pre-process of a HDTV encoder and then returned by the post-process of a HDTV decoder.

(c) Different QMF Quadrature Mirror filter filters (filters 16–18) are used for a first field and a second field.

In order to perform the pre-process and post-process in the solutions (a) and (b), specially designed processing circuits are required. Further, in the solution (c), two kinds of filters are necessary, causing the hardware to be complicated.

BRIEF SUMMARY OF THE INVENTION

1. Object of the Invention

An object of the present invention is to provide an image signal processing method and apparatus compatible for both HD and SD image signals and capable of obtaining an SD corresponding image without breakage of interlace structure or using complicated hardware.

2. Brief Summary

In order to achieve the above mentioned object, an image signal processing method and apparatus is provided in which high definition image signals of interlaced fields are divided into standard definition corresponding image signals and additional image signals whereby reproduction of the high definition image is possible by adding the additional image signals to the standard definition corresponding image signal. The system incorporating the principles of the present invention performs a vertical line sub-sampling every field with a ratio of an N:1, where N is an odd number greater than 1, by taking a line relation on a reproducing image screen into consideration.

According to an embodiment of the present invention, the sub-sampling of the line is performed vertically with the ratio of an N:1, where N is an odd number greater than 1, while considering the positional relation of scan lines on the reproducing image screen by using one of the simple sub-sampling method, the pyramidal coding method and the sub-band coding method. With this scheme, it is possible to maintain the interlace structure of the fields without using complicated apparatus construction and still obtain apparatus compatible with both the high definition image and the standard definition image.

According to a first aspect of the present invention, an image signal processing method is provided in which high definition image signals of interlaced fields are divided into standard definition corresponding image signals and additional image signals. Reproduction of the high definition image is possible by adding the additional image signals to the standard definition corresponding image signal. This method comprises the steps of sub-sampling vertical lines of first fields of the high definition image signal at a ratio of an N:1, where N is an odd number greater than 1, and sub-sampling vertical lines of the remaining fields of the high definition image signal at the ratio of an N:1, where N is an odd number greater than 1, such that the sub-sampled first fields are interlaced with the sub-sampled remaining fields.

According to a second aspect of the present invention, an image signal processing apparatus is provided in which high definition image signals of interlaced fields are divided into standard definition corresponding image signals and additional image signals. Reproduction of the high definition image is possible by adding the additional image signals to the standard definition corresponding image signal. This apparatus comprises sampling means for sub-sampling horizontally the high definition image signal, sub-sampling vertically every field of the high definition image signal at a ratio of an N:1, where N is an odd number greater than 1, and outputting the standard definition corresponding image signal. Interpolation means are provided for performing a horizontal interpolation of the output signal of the sampling means and performing an interpolation of 1:N, where N is an odd number greater than 1, vertically. Subtraction means are also provided for subtracting an output signal of the interpolation means from the high definition image signal and outputting the additional image signal.

Further, according to a third aspect of the present invention, an image signal processing apparatus is provided in which high definition image signals of interlaced fields are divided into standard definition corresponding image signals and additional image signals. Reproduction of the high definition image is possible by adding the additional image signals to the standard definition corresponding image signal. Such apparatus comprises first band dividing means for dividing the high definition image signal into a plurality of frequency bands and first sampling means for sub-sampling an output of the first band dividing means horizontally. Second band dividing means are provided for dividing the output of the first sampling means into a plurality of frequency bands. Second sampling means are included for sub-sampling vertically every field of the output of the second band dividing means at a ratio of N:1, where N is an odd number greater than 1.

The above and other related objects and features of the present invention will be apparent from a reading of the following description of the disclosure found in the accompanying drawings and the novelty thereof pointed out in the appended claims.

BRIEF DESCRIPTION OF THE DRAWINGS

FIG. 7 is a block diagram of an image signal processing device according to a first embodiment of the present invention;

DETAILED DESCRIPTION OF THE INVENTION

Figure 1:
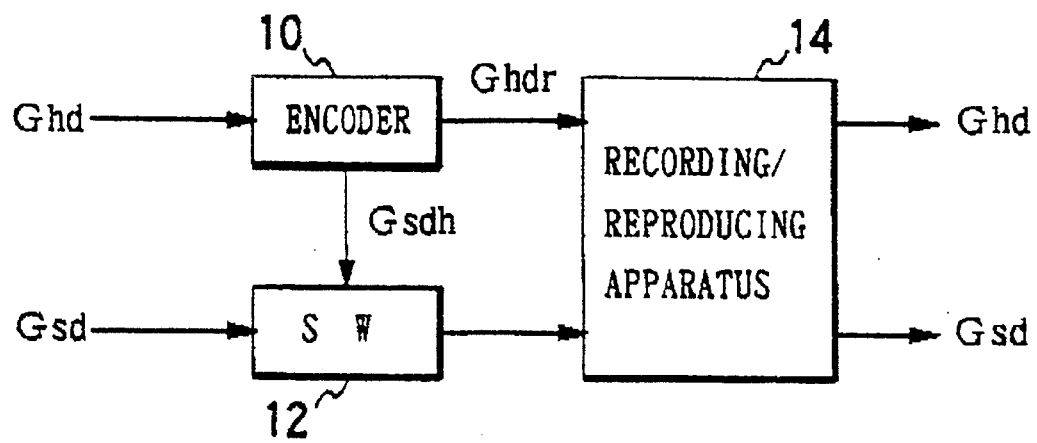
FIG. 1 is a block diagram showing a basic known construction of an apparatus capable of processing both HD and SD images.
Figure 2:
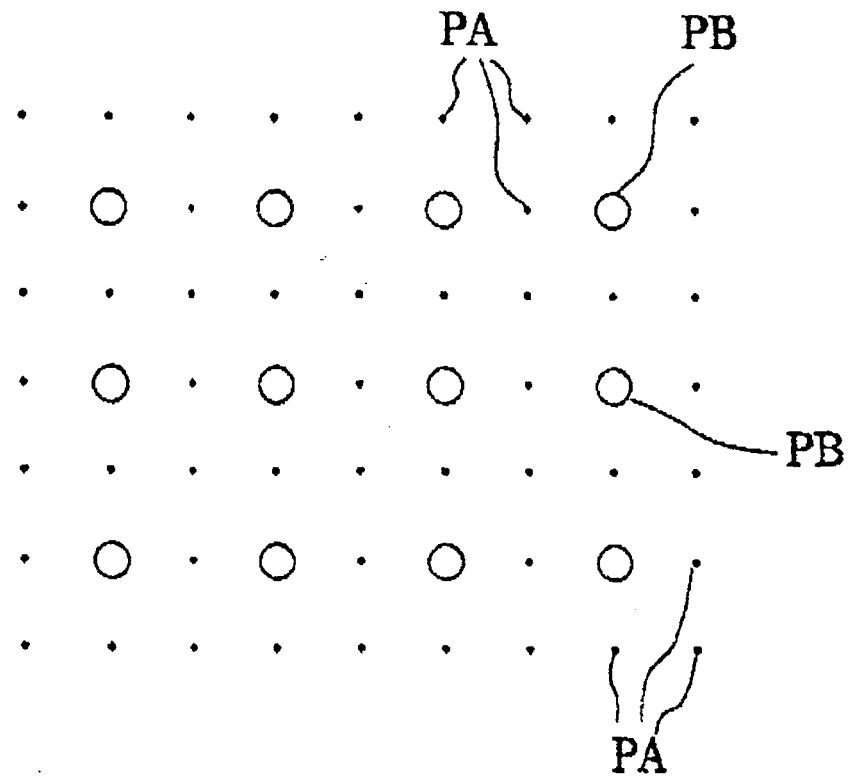
FIG. 2 is an illustration showing a conventional 2:1 simple sub-sampling method.
Figure 3:
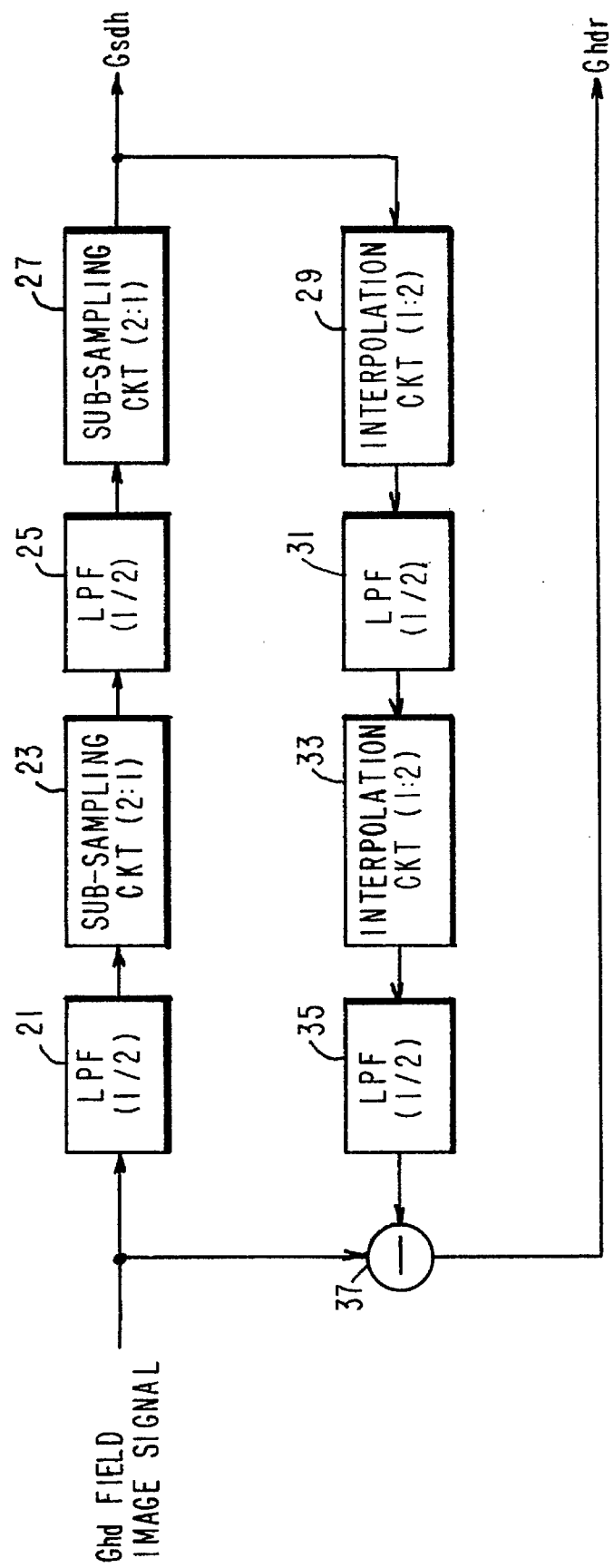
FIG. 3 is a block diagram showing a main portion of a processing circuit for a conventional pyramidal coding.
Figure 4:
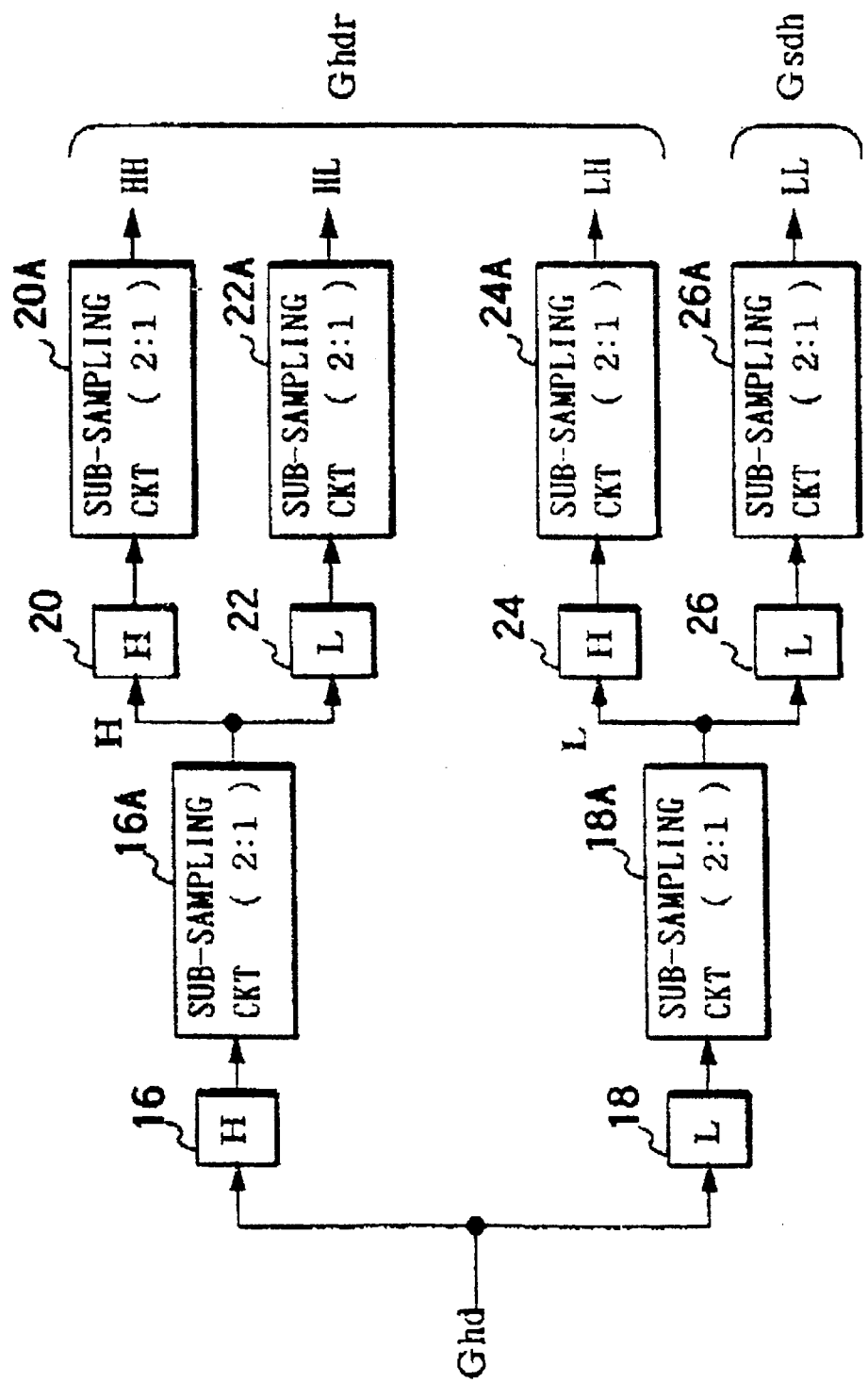
FIG. 4 is a block diagram showing a main portion of a processing circuit for a conventional sub-band coding.
Figure 5A:
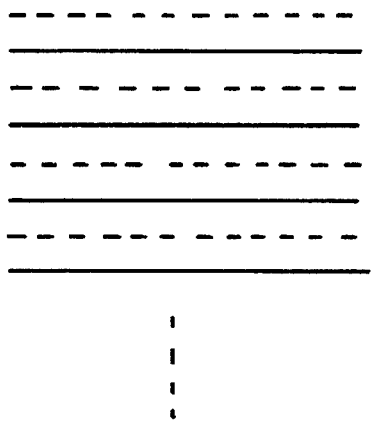
FIGS. 5(A) and 5(B), show an interlace structure of fields in the case of the conventional simple sub-sampling.
Figure 5B:
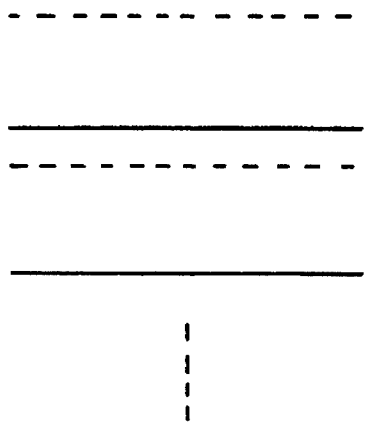

The image signal processing method according to the present invention will be described with reference to the drawings which show embodiments of the image signal processing devices for performing the method.

First Embodiment

FIG. 7 is a block diagram of an image signal processing device according to a first embodiment of the present invention. The first embodiment utilizes the pyramidal coding method and performs a vertical sub-sampling at a ratio of 3:1.

In FIG. 7, reference numerals 51, 55, 61 and 65 depict low-pass filters (LPFs), 53 and 57 sub-sampling circuits, 59 and 63 interpolation circuits and 67 a subtracter.

In the same figure, for an HD image signal, Ghd, of each field, a horizontal frequency band is limited by the LPF 51. In detail, the frequency band of the input image signal is limited to one half of fH/2 where fH is a horizontal sampling frequency of the input image signal. Then, the output signal of the LPF 51 is sub-sampled by the sub-sampling circuit 53. Thus, the output signal of the LPF 51 is sub-sampled horizontally at a ratio of 2:1.

Thereafter, a frequency band of an output signal of the sub-sampling circuit 53 is limited vertically by the LPF 55 to substantially one third of fV/2 where fV is a vertical sampling frequency of the input image signal. An output signal of the LPF 55 is supplied to the sub-sampling circuit 57. The sub-sampling circuit 57 sub-samples the output signal of the LPF 55 vertically at a ratio of 3:1. An output signal of the sub-sampling circuit 57 is output as an SD corresponding image signal Gsdh.

The SD corresponding image signal Gsdh is supplied to an interpolation circuit 59 in which a "0" value interpolation (1:3 interpolation) is performed twice vertically for each sample. Therefore, the number of samples in the vertical direction increases three times. An output signal of the interpolation circuit 59 is supplied to an LPF 61. The LPF 61 is similar to the LPF 55 and limits a frequency band of the output signal of the interpolation circuit vertically to substantially one third of fV/2. An output signal of the LPF 61 is supplied to an interpolation circuit 63. The interpolation circuit 63 performs a "0" value interpolation (1:2 interpolation) for an output signal of the LPF 61 once horizontally for each sample to increase the number of samples in the horizontal direction by two times. An output signal of the interpolation circuit 63 is supplied to an LPF 65. The LPF 65 is similar to the LPF 51 and limits a frequency band of the output signal of the interpolation circuit 63 horizontally to substantially one half of the fH/2.

An output signal of the LPF 65 which is band limited corresponds to an image having the same number of pixels as those of the HD image signal Ghd in both the horizontal and vertical directions. The output signal of the LPF 65 is supplied to a subtracter 67 in which it is subtracted from the HD image signal Ghd, every pixel, resulting in the additional image signal Ghdr.

Figure 6A:
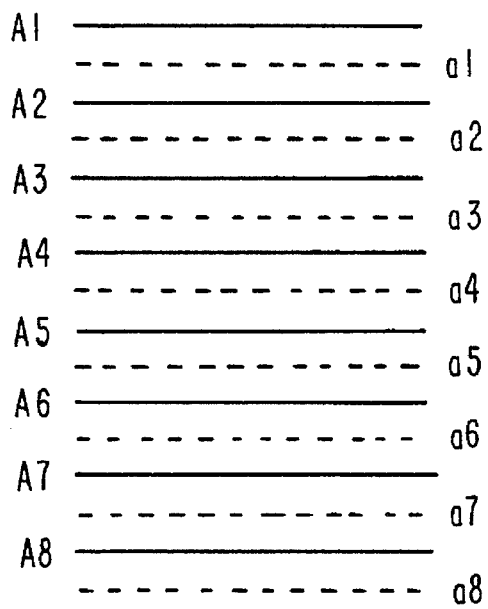
FIGS. 6(A) and 6(B), show an interlace structure of fields in an image signal processing method according to an embodiment of the present invention.
Figure 6B:
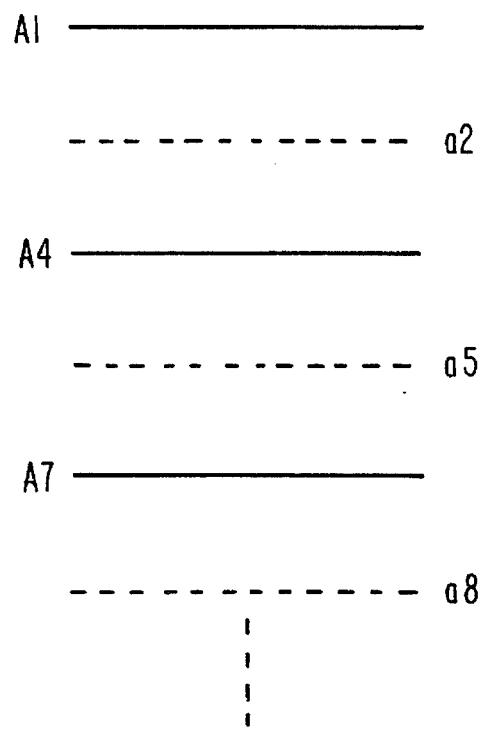

Now, the above mentioned sub-sampling process will be described. It is assumed that a sub-sampling at a ratio of 3:1, that is, every third line, is performed for an HD image shown in FIG. 6(A). In this case, the result becomes such as shown in FIG. 6(B). Describing this in more detail, a line A1 among lines A1, A2 and A3 for the odd numbered fields (first fields) shown by solid lines is derived or sub-sampled. Similarly, a line A4 among lines A4, A5 and A6 for the odd numbered fields (first fields) shown by solid lines is derived, and so on.

On the other hand, a line a2 among lines a1, a2 and a3 for the even numbered fields (the remaining fields) shown by dotted lines is derived taking a positional relation on a reproduced image screen into consideration. Similarly, a line a5 among lines a4, a5 and a6, which is positioned at the center between the line derived in the odd numbered lines, is derived, and so on.

By performing the sub-sampling at a ratio of 3:1, by taking the positional relation of the lines of the respective fields which are interlaced and displayed into consideration as mentioned above, the SD corresponding image having an unbroken interlace structure as shown in FIG. 6(B), is obtained. That is, the SD corresponding image also has an interlace structure. Any lines in a field may be sub-sampled provided that positions thereof on the reproduced image screen are considered in the way as mentioned above. For example, it is possible to sub-sample center lines such as A2, A5, . . . of an odd numbered field and, for an even numbered field, it is possible to sub-sample a3, a6, . . .

Since the interlace structure can be maintained satisfactorily as mentioned above, the LPFs 51, 55, 61 and 65 shown in FIG. 7 are not required to have different characteristics for every field, leading to a simplication of circuit construction.

Second Embodiment

Figure 8:
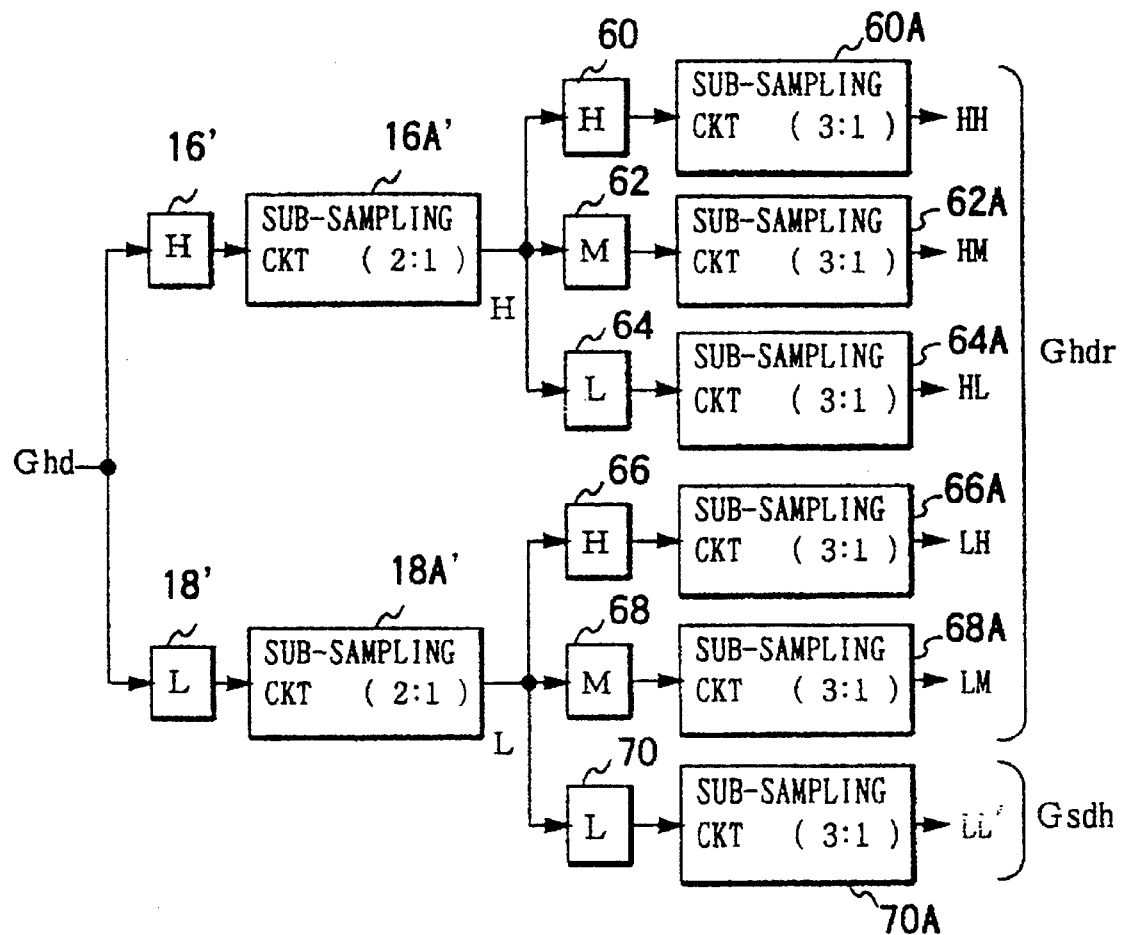
FIG. 8 is a block diagram of an image signal processing device according to a second embodiment of the present invention.

A second embodiment of the present invention will be described with reference to FIGS. 8 and 9. In this embodiment, the sub-band coding method is utilized. FIG. 8 shows a main portion of a circuit construction of the second embodiment In FIG. 8, reference numerals 16', 18' (QMF filters), 60, 62, 64, 66, 68 and 70 depict filters (sub-band analysis filter), 16A', 18A', 60A, 62A, 64A, 66A, 68A and 70A depict sub-sampling circuits.

In FIG. 8, an HD image signal Ghd of an odd or even numbered field is divided by the filters 16' and 18' horizontally into a high frequency component and a low frequency component, respectively. Output signals of the filters 16' and 18' are sub-sampled horizontally by the sub-sampling circuits 16A' and 18A' at a ratio of 2:1, respectively.

A high frequency component H from the sub-sampling circuit 16A' is divided vertically by the filters 60, 62 and 64 into three frequency components, a high frequency component, a middle frequency component and a low frequency component. Output signal from the filters 60, 62 and 64 are sub-sampled vertically by the sub-sampling circuits 60A, 62A and 64A at a ratio of 3:1, respectively.

Further, the low frequency component L from the sub-sampling circuit 18A' is divided vertically by the filters 66, 68 and 70 into three frequency components, a high frequency component, a middle frequency component and a low frequency component. Output signals from the filters 66, 68 and 70 are sub-sampled vertically by the sub-sampling circuits 66A, 68A and 70A at a ratio of 3:1, respectively. In this case, the sub-sampling circuit 70A sub-samples the output of the filter 70 vertically at a ratio of 3:1 by making the positional relation of lines of the respective fields such that a low frequency band signal LL which is sub-sampled as shown in FIG. 6(A) satisfies the interlace structure.

Figure 9:
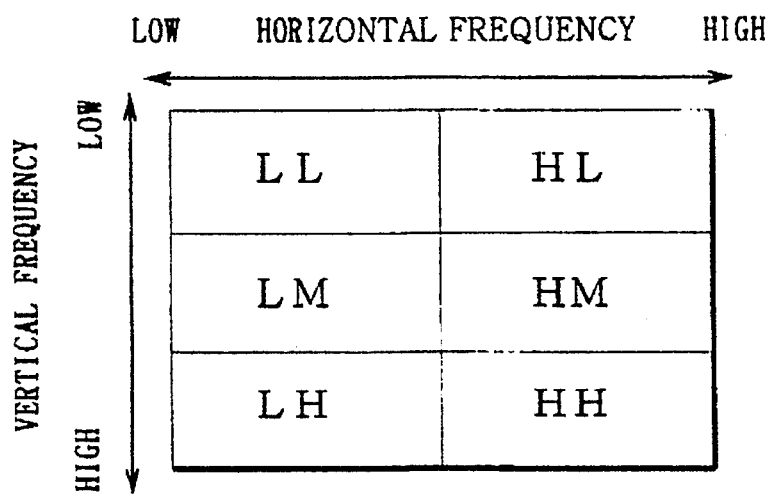
FIG. 9 illustrates a sub-band division in the second embodiment of the present invention.

By performing the above mentioned sub-band dividing process, six band signals HH, LH, HM, LM, HL and LL shown in FIG. 9 are obtained. Among others, the LL signal is used as the SD corresponding image signal, Gsdh, and the remaining five band signals HH, LH, HM, LM and HL are used as the additional image signal Ghdr.

According to the second embodiment, the HD signal is divided vertically into three bands. The LL signal which is used as the SD corresponding image signal Gsdh is one derived every third line as described with reference to FIG. 6(B). Therefore, the LL signal output from the sub-sampling circuit 70A completely satisfies the positional structure of interlaced scan lines. Since the positional structure of interlaced scan lines of the LL signal is maintained satisfactorily, the filters 60, 62, 64, 66, 68 and 70 shown in FIG. 8 are not required to have different characteristics for every field, leading to a simplification of circuit construction.

Further, by utilizing the sub-band coding method as in the second embodiment, it is possible to reduce the number of pixels of the additional image signal Ghdr compared with the case where the pyramidal coding method is utilized. Further, it is possible to reduce power consumption for the additional image signal compared with the case where the simple sub-sampling method is utilzed. These advantages are important in the case where the amount of information of an image signal is compressed for purposes of transmission or recording. In other words, it is possible to improve the image quality of a reproduced image when the amount of information is identical.

Other Embodiments

The present invention is not limited to the above mentioned embodiments and is also applicable to the following cases, for example:

(1) Although the vertical sub-sampling is performed at a sub-sampling ratio of 3:1 in the first and second embodiments, the sub-sampling ratio may be an N:1 where N is an odd number greater than 1, generally, with the same effect as that of the first or second embodiment.

(2) The HD and SD image signals are not limited to a High-Vision signal and an NTSC signal.

(3) In the first and second embodiments, the pyramidal coding and the sub-band coding methods are used. For the case of the simple sub-sampling method, the HD image signal Ghd is directly sub-sampled as described with respect to FIGS. 6(A) and 6(B).

What claimed is:

1. An image signal processing method in which high definition image signals of interlaced fields are divided into standard definition corresponding image signals and additional image signals whereby reproduction of the high definition image is possible by adding the additional image signals to the standard definition corresponding image signal comprising the steps of:

sub-sampling vertical lines of first fields of the high definition image signal at a ratio of N:1, where N is an odd number greater than 1; and sub-sampling vertical lines of the remaining fields of the high definition image signal at a ratio of N:1, where N is an odd number greater than 1 such that the sub-sampling first fields are interlaced with the sub-sampled remaining fields.

2. The image signal processing method claimed in claim 1, wherein said sub-sampling process is performed according to one of the group including simple sub-sampling, the pyramidal coding or the sub-band coding.

3. An image signal processing apparatus in which high definition image signals of interlaced fields are divided into standard definition corresponding image signals and additional image signals whereby a reproduction of the high definition image is possible by adding said additional image signals to said standard definition corresponding image signal, comprising:

sampling means for sub-sampling horizontally the high definition image signal, sub-sampling vertically every field at a ratio of N:1, where N is an odd number greater than 1 to produce the standard definition corresponding image signal as an output signal;

interpolation means for performing a horizontal interpolation for said output signal of said sampling means and performing an interpolation at a ratio of 1:N, where N is an odd number greater than 1, vertically to produce a further output signal; and subtraction means for subtracting said further output signal of said interpolation means from said high definition image signal and outputting said additional image signal.

4. The image signal processing apparatus claimed in claim 3, wherein said sampling means performs a sub-sampling horizontally at a ratio of 2:1 and said interpolation means performs an interpolation horizontally at a ratio of 1:2.

5. An image signal processing apparatus in which high definition image signals of interlaced fields are divided into standard definition corresponding image signals and additional image signals wherein reproduction of the high definition image is possible by adding said additional image signals to said standard definition corresponding image signal, comprising:

first band dividing means for dividing the high definition image signal into a plurality of frequency bands;

first sampling means for sub-sampling an output of said first band dividing means horizontally;

second band dividing means for dividing the output of said first sampling means into a plurality of frequency bands; and second sampling means for sub-sampling vertically every field of the output of said second band dividing means at a ratio of N:1, where N is an odd number greater than 1.

6. The image signal processing apparatus claimed in claim 5, wherein said first sampling means performs a sub-sampling horizontally at a ratio of 2:1.

7. An image signal processing apparatus in which high definition image signals of interlaced fields are divided into standard definition corresponding image signals and additional image signals whereby reproduction of the high definition image is possible by adding said additional image signals to said standard image signals comprising:

first sampling means for sub-sampling at least the vertical lines of first fields of the high definition image signal at a ratio of N:1, where N is an odd number greater than 1; and second sampling means for sub-sampling at least the vertical lines of the remaining fields of the high definition image signal at a ratio of N:1, where N is an odd number greater than 1 such that the sub-sampled first fields are interlaced with the sub-sampled remaining fields to produce an interlaced standard image signal.

8. An image signal processing apparatus as claimed in claim 7, wherein said first and second sampling means sub-samples horizontally the high definition image signal and sub-samples vertically every field at a ratio of N:1, where N is an odd number greater than 1 to produce the standard definition corresponding image signal as an output signal;

interpolation means for performing a horizontal interpolation for said output signal and performing an interpolation at a ratio of 1:N where N is an odd number greater than 1 vertically to produce a further output signal; and subtraction means for subtracting said further output signal of said interpolation means from said high definition image signal and outputting said additional image signal.

9. The image signal processing apparatus as claimed in claim 8, wherein said first and second sampling means performs a sub-sampling horizontally at a ratio of 2:1 and said interpolation means performs an interpolation horizontally at a ratio of 1:2.

10. An image signal processing as claimed in claim 7 further comprising:

first band dividing means for dividing the high definition image signal into a plurality of frequency bands;

said first sampling means sub-samples an output of said first band dividing means horizontally;

second band dividing means for dividing the output of said first sampling means into a plurality of frequency bands; and said second sampling means sub-samples vertically every field of the output of said second band dividing means at a ratio of N:1, where N is an odd number greater than 1.

11. The image signal processing apparatus as claimed in claim 10, wherein said first sampling means performs a sub-sampling horizontally at a ratio of 2:1.

* * * * *